(12) United States Patent
Hattori

(10) Patent No.: US 7,933,039 B2
(45) Date of Patent: Apr. 26, 2011

(54) APPARATUS, METHOD, AND COMPUTER PROGRAM PRODUCT FOR FORMING IMAGE

(75) Inventor: Yasuhiro Hattori, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 692 days.

(21) Appl. No.: 11/987,474

(22) Filed: Nov. 30, 2007

(65) Prior Publication Data

US 2008/0137141 A1    Jun. 12, 2008

(30) Foreign Application Priority Data

Dec. 7, 2006  (JP) ................. 2006-330715

(51) Int. Cl.
  *G06F 3/12* (2006.01)
(52) U.S. Cl. ........................ 358/1.16; 358/1.9
(58) Field of Classification Search .................. 358/1.1, 358/1.9, 1.16, 501, 539, 401, 444
  See application file for complete search history.

(56) References Cited

U.S. PATENT DOCUMENTS

| | | | |
|---|---|---|---|
| 5,987,227 A | 11/1999 | Endo et al. | |
| 6,226,102 B1 | 5/2001 | Koike et al. | |
| 6,449,064 B1 | 9/2002 | Hattori et al. | |
| 6,708,234 B2 | 3/2004 | Moteki et al. | |
| 6,980,702 B2 | 12/2005 | Michiie et al. | |
| 7,016,076 B2 * | 3/2006 | Izumi | 358/1.9 |
| 7,034,838 B2 | 4/2006 | Obata et al. | |
| 7,142,730 B2 | 11/2006 | Michiie et al. | |
| 7,185,151 B2 | 2/2007 | Michiie et al. | |
| 7,259,876 B2 | 8/2007 | Obata et al. | |
| 2004/0212830 A1 * | 10/2004 | Takahashi et al. | 358/1.16 |
| 2005/0174675 A1 | 8/2005 | Hattori et al. | |
| 2006/0038820 A1 * | 2/2006 | Kitani | 345/531 |
| 2006/0212629 A1 | 9/2006 | Suzuki et al. | |
| 2006/0215221 A1 | 9/2006 | Suzuki et al. | |
| 2007/0223068 A1 | 9/2007 | Ishii et al. | |
| 2007/0229922 A1 | 10/2007 | Hattori | |

FOREIGN PATENT DOCUMENTS

JP    2005-067004    3/2005

* cited by examiner

*Primary Examiner* — Thomas D Lee

(74) *Attorney, Agent, or Firm* — Harness, Dickey & Pierce, P.L.C.

(57) ABSTRACT

An image reading unit reads an image as a first image represented in a first color space. A color converting unit converts the first image into a second image represented in a second color space. A storing unit stores therein the first image and the second image. A printing unit prints the second image stored in the storing unit.

8 Claims, 9 Drawing Sheets

APPARATUS, METHOD, AND COMPUTER PROGRAM PRODUCT FOR FORMING IMAGE

CROSS-REFERENCE TO RELATED APPLICATIONS

The present application claims priority to and incorporates by reference the entire contents of Japanese priority document, 2006-330715 filed in Japan on Dec. 7, 2006.

BACKGROUND OF THE INVENTION

1. Field of the Invention

The present invention generally relates to an image forming apparatus that includes a memory for storing image data.

2. Description of the Related Art

In a conventional image forming apparatus disclosed in, for example, Japanese Patent Application Laid-open No. 2005-067004, an RGB video signal output by, for example, a scanner is converted into CMYK data for printing and the CMYK data is stored in a memory. However, the CMYK data used for printing by the image forming apparatus cannot be employed for other use, for example, sending an e-mail or a facsimile (fax) and printing by a different image forming apparatus. Therefore, in a multifunction product (MFP) having a fax function as well as an image forming function, it is necessary to store different types of data for different functions in a memory, decreasing usage efficiency of a memory and increasing memory consumption.

SUMMARY OF THE INVENTION

It is an object of the present invention to at least partially solve the problems in the conventional technology.

An image forming apparatus according to one aspect of the present invention includes an image reading unit that reads an image as a first image represented in a first color space; a color converting unit that converts the first image into a second image represented in a second color space; a storing unit that stores therein the first image and the second image; and a printing unit that prints the second image stored in the storing unit.

An image forming method according to another aspect of the present invention includes converting a first image represented in a first color space read by an image reading unit into a second image represented in a second color space and reading the second image stored in a storing unit that stores therein the first image and the second image.

A computer program product according to still another aspect of the present invention includes a computer-usable medium having computer-readable program codes embodied in the medium that when executed cause a computer to execute converting a first image represented in a first color space read by an image reading unit into a second image represented in a second color space and reading the second image stored in a storing unit that stores therein the first image and the second image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
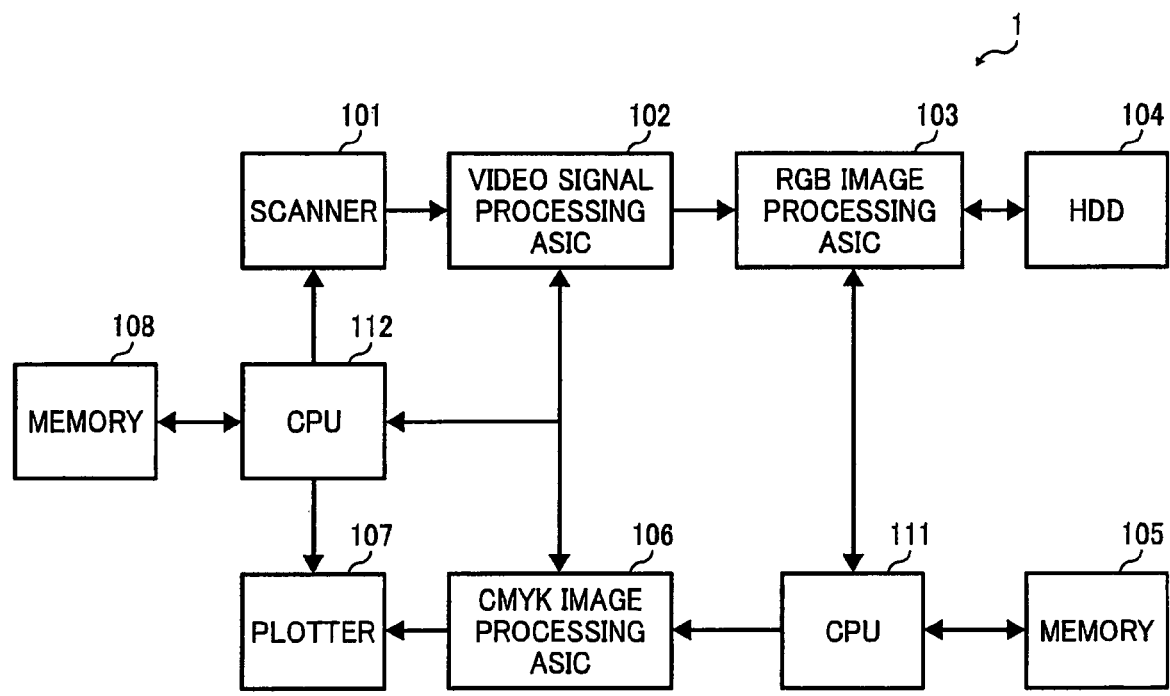
FIG. 1 is a block diagram of an image forming apparatus according to a first embodiment of the present invention.

FIG. 1 is a block diagram of an image forming apparatus 1 according to a first embodiment of the present invention. The image forming apparatus 1 includes a scanner 101, a video signal processing application specific integrated circuit (ASIC) 102, an RGB image processing ASIC 103, a hard disk drive (HDD) 104, a memory 105, a CMYK image processing ASIC 106, a plotter 107, a memory 108, a CPU 111, and a CPU 112. The scanner 101 reads an original document and outputs RGB image data. The video signal processing ASIC 102 generates an image-area separating signal corresponding to the RGB image. The image-area separating signal is information indicating whether each pixel is for a half-tone image or a text image.

The RGB image and the image-area separating signal are input to the RGB image processing ASIC 103, and the RGB image processing ASIC 103 generates a joint photographic experts group (JPEG) image based on the RGB image and the image-area separating signal. The RGB image processing ASIC 103 decompresses the JPEG image into the RGB image. The RGB image processing ASIC 103 performs a color conversion to convert the RGB image into a CMYK image (CMYK image data). The RGB image processing ASIC serves as a color converting unit, a first compressing unit, and a first decompressing unit.

The HDD 104 stores therein the RGB image. The memory 105 used as a heap of the CPU 111 stores therein, for example, the JPEG image and the CMYK image generated by the RGB image processing ASIC 103.

The CMYK image processing ASIC 106 reads the CMYK image from the memory 105 and outputs the CMYK image to the plotter 107. The CPU 111 and the CPU 112 communicate via the CMYK image processing ASIC 106. The plotter 107 reads the CMYK image from the CMYK image processing ASIC 106 and prints the CMYK image on a transfer sheet.

The CPU 111 controls the RGB image processing ASIC 103 and the CMYK image processing ASIC 106 and manages the HDD 104 and the memory 105. The CPU 112 controls the scanner 101, the video signal processing ASIC 102, the CMYK image processing ASIC 106, and the plotter 107, and manages the memory 108 that is used as a heap of the CPU 112.

Figure 2:
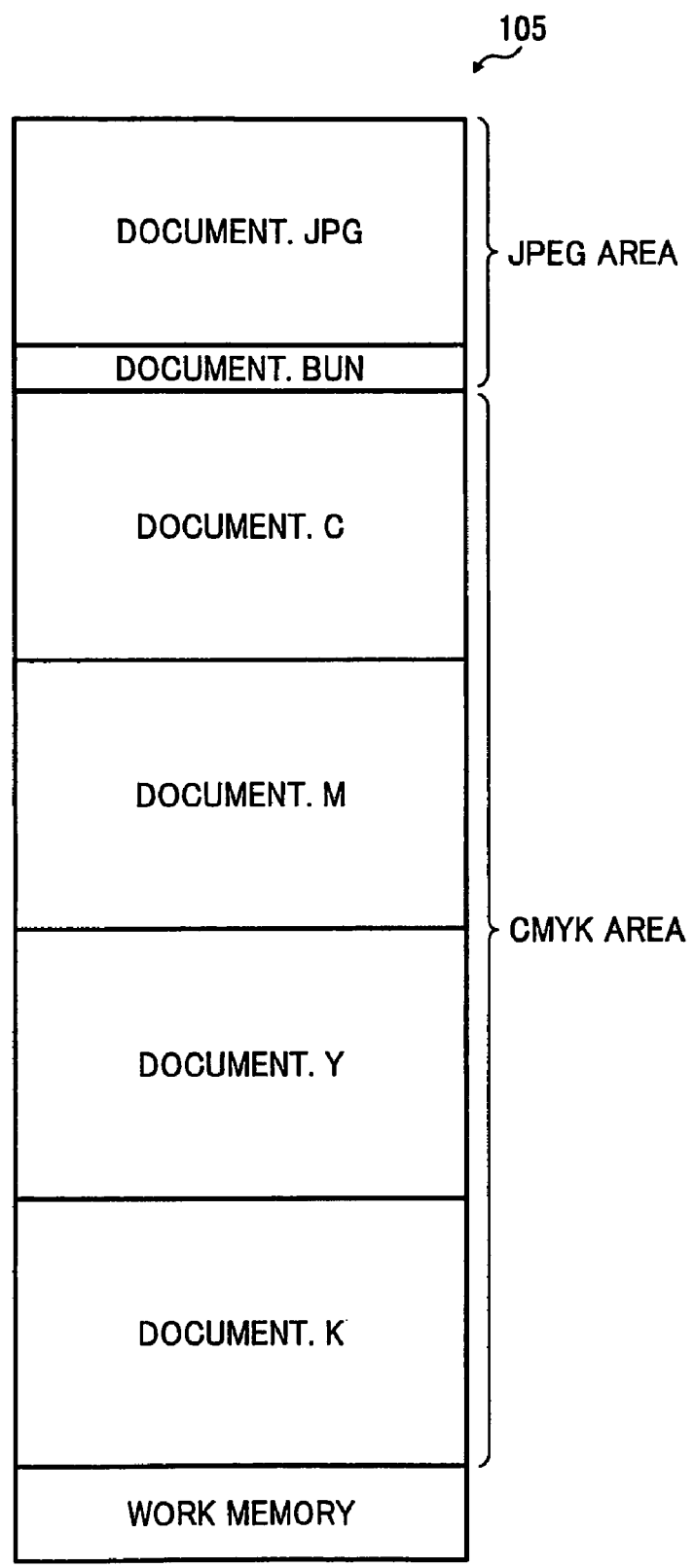
FIG. 2 is an example of a data structure of a memory shown in FIG. 1.

FIG. 2 is an example of a data structure of the memory 105. The memory 105 includes a JPEG area for storing a JPEG image (DOCUMENT.JPG) and an image-area separating signal (DOCUMENT.BUN), and a CMYK area for storing the CMYK image (DOCUMENT.C, DOCUMENT.M, DOCUMENT.Y, DOCUMENT.K) corresponding to the JPEG image. The memory 105 further includes a work memory area used for other processing for, for example, outputting an image to a different unit. Each of the JPEG area, the CMYK area, and the work memory area has a variable length or a fixed length.

In this manner, because the memory 105 stores therein not only the CMYK image but also the JPEG image obtained by compressing the RGB image, for example, the JPEG image, i.e., the RGB image, can be used in a fax function.

Figure 3:
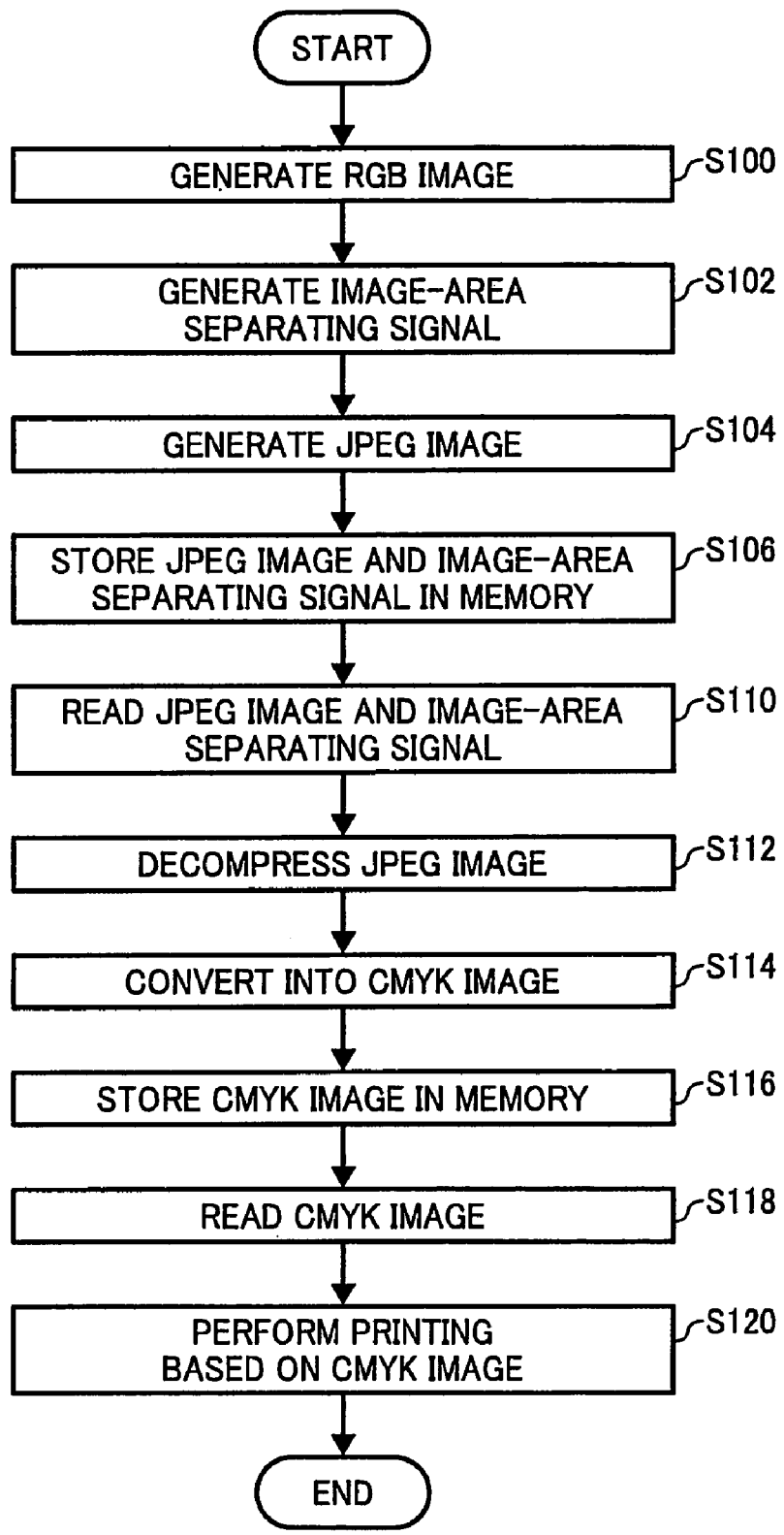
FIG. 3 is a flowchart of a process performed by the image forming apparatus shown in FIG. 1.

FIG. 3 is a flowchart of a process performed by the image forming apparatus 1. The scanner 101 reads an original document and generates an RGB image (step S100) and generates an image-area separating signal based on the RGB image (step S102). Based on the RGB image and the image-area separating signal, the RGB image processing ASIC 103 compresses the RGB image into a JPEG image (step S104). The RGB image processing ASIC 103 stores the JPEG image and the image-area separating signal in the JPEG area of the memory 105 (step S106).

Subsequently, the RGB image processing ASIC 103 reads the JPEG image and the image-area separating signal from the memory 105 (step S110) and decompresses the JPEG image into the RGB image (step S112). The RGB image processing ASIC 103 performs a color conversion to convert the RGB image into the CMYK image (step S114).

After the RGB image is obtained at step S112, the RGB image is not stored in the memory 105 and is directly converted into the CMYK image. Therefore, no process is required for writing the RGB image in the memory 105 and reading the RGB image from the memory 105, which saves a process time and the memory capacity.

The RGB image processing ASIC 103 stores the CMYK image obtained at step S114 in the CMYK area of the memory 105 (step S116). Thereafter, the CMYK image processing ASIC 106 reads the CMYK image from the CMYK area (step S118). Based on the CMYK image read by the CMYK image processing ASIC 106, the plotter 107 performs a printing process (step S120). In this manner, the process performed by the image forming apparatus 1 is completed.

Because the memory 105 stores not only the CMYK image but also the JPEG image obtained by compressing the RGB image, the JPEG image can be used for a function other than printing, such as a mail function or the fax function. The mail function or the fax function can be included in the image forming apparatus 1, or an internal device can have such functions.

Figure 4:
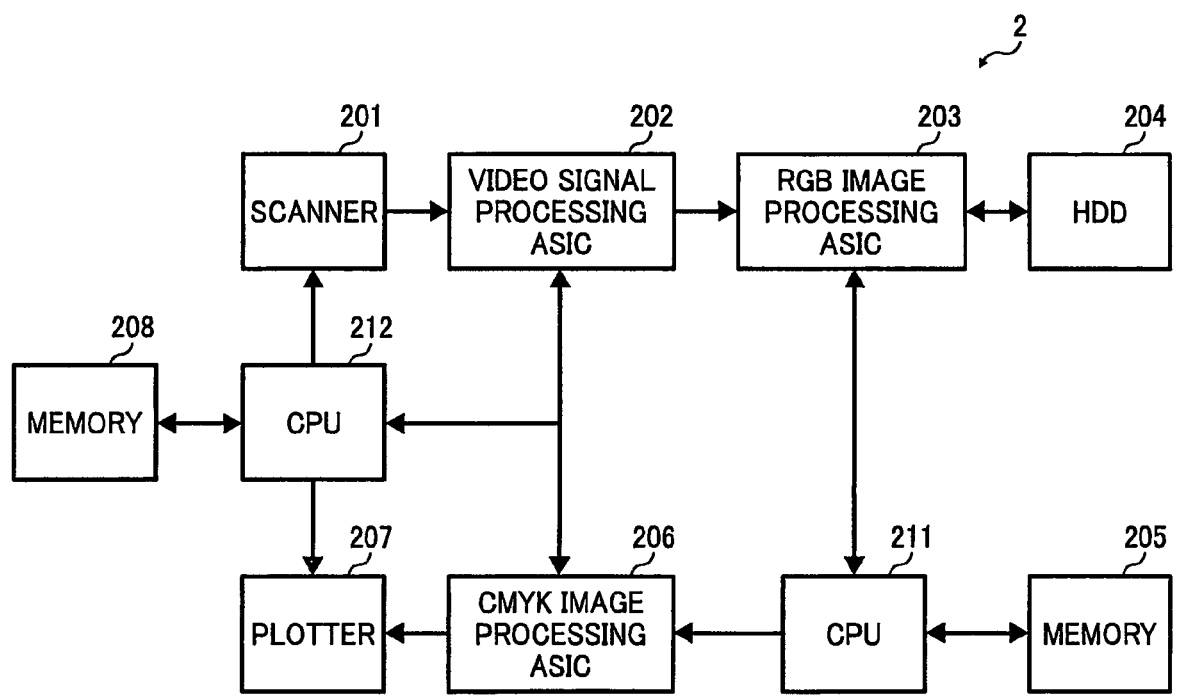
FIG. 4 is a block diagram of an image forming apparatus according to a second embodiment of the present invention.

FIG. 4 is a block diagram of an image forming apparatus 2 according to a second embodiment of the present invention. The image forming apparatus 2 includes a scanner 201, a video signal processing ASIC 202, an RGB image processing ASIC 203, a HDD 204, a memory 205, a CMYK image processing ASIC 206, a plotter 207, a memory 208, a CPU 211, and a CPU 212.

The video signal processing ASIC 202 divides an RGB image output from the scanner 201 on a band basis into RGB band images. A band is an area with a predetermined size that can be obtained by dividing the RGB image along boundaries in a main scanning direction. Each of the RGB band images is data representing an image corresponding to a predetermined area of the RGB image. The video signal processing ASIC 202 generates and outputs image-area separating signals that correspond respectively to the RGB band images obtained by dividing the RGB image.

The RGB band images and the image-area separating signals are input into the RGB image processing ASIC 203, and the RGB image processing ASIC 203 generates JPEG band images each corresponding to each band. The RGB image processing ASIC 203 decompresses the JPEG band image into an RGB band image and performs a color conversion to convert the RGB band image into a CMYK band image on a band basis. The RBG image processing ASIC 203 serves as a color converting unit, a first compressing unit, a first decompressing unit, and a dividing unit.

The CMYK image processing ASIC 206 reads the CMYK band image from the memory 205, and compresses the CMYK band image into a compressed CMYK band image. Thereafter, the CMYK image processing ASIC 206 reads the compressed CMYK band image from the memory 205 and decompresses the compressed CMYK band image into the CMYK band image. The CMYK image processing ASIC 206 serves as a second decompressing unit and a second compressing unit. The plotter 207 receives CMYK images corresponding to one page, and prints the CMYK images onto a transfer sheet.

When printing an image corresponding to one page, the image forming apparatus 1 according to the first embodiment employs a sequential manner such that the image is read and stored in the memory 105 as a JPEG image, and then, the JPEG image is read and converted into a CMYK image.

Meanwhile, in the image forming apparatus 2 according to the second embodiment, the process for storing the JPEG image and a color conversion are performed on a band basis, which increases the processing speed. Particularly, a time from reading of a first image to printing of the first image can be shortened, i.e., a first copy time can be reduced. Furthermore, because the compressed CMYK band images are stored in the memory 205, it is possible to save the memory capacity.

Figure 5:
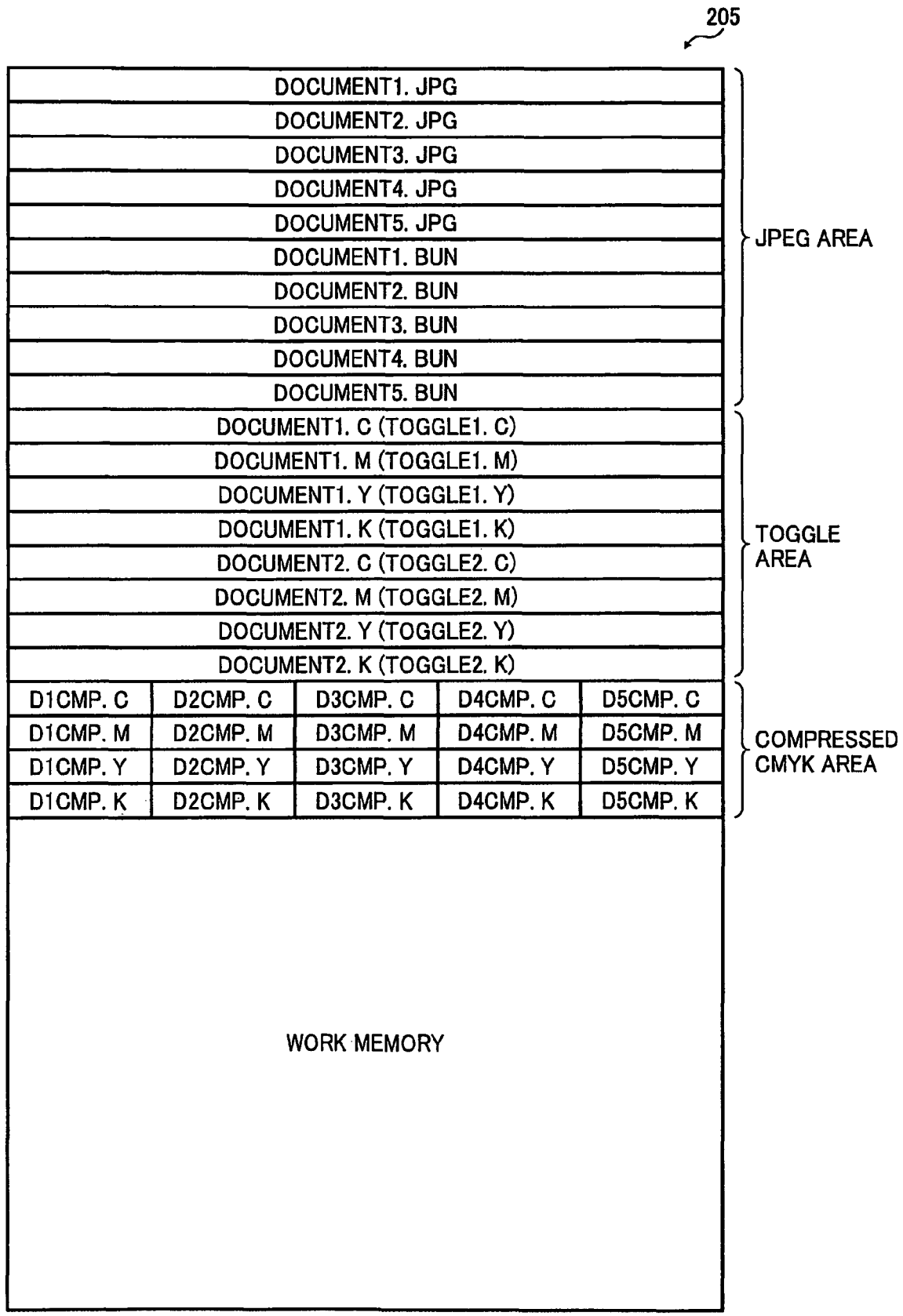
FIG. 5 is an example of a data structure a memory shown in FIG. 4.

FIG. 5 is an example of a data structure of the memory 205. The memory 205 includes a JPEG area, a toggle area, and a compressed CMYK area. In the JPEG area, are stored a plurality of JPEG band images (DOCUMENT1.JPG, DOCUMENT2.JPG, DOCUMENT3.JPG, DOCUMENT4.JPG, and DOCUMENT5.JPG), and the image-area separating signals (DOCUMENT1.BUN, DOCUMENT2.BUN, DOCUMENT3.BUN, DOCUMENT4.BUN, and DOCUMENT5.BUN) corresponding to the respective JPEG band images. The JPEG band images of DOCUMENT1.JPG to DOCUMENT5.JPEG correspond to one page.

In the toggle region, the CMYK band images corresponding respectively to the JPEG band images are stored. The toggle area has a toggle structure including two areas of TOGGLE1 and TOGGLE2. For example, the CMYK band image (DOCUMENT1.C, DOCUMENT1.M, DOCUMENT1.Y, and DOCUMENT1.K) corresponding to a first band is stored in the area of TOGGLE1, and the CMYK band image (DOCUMENT2.C, DOCUMENT2.M, DOCUMENT2.Y, and DOCUMENT2.K) corresponding to a second band is stored in the area of TOGGLE2.

A CMYK band image (DOCUMENTx (x=1 to 5).C, DOCUMENTx.M, DOCUMENTx.Y, and DOCUMENTx.K) is data obtained by performing a color conversion to convert an RGB band image obtained by decompressing a JPEG band image (DOCUMENTx.jpg).

The compressed CMYK band image is stored in the compressed CMYK area. Regarding the example shown in FIG. 5, the compressed CMYK band images corresponding to five bands, i.e., one page, are stored. The compressed CMYK band images of Dx(x=1 to 5)CMP.C, DxCMP.M, DxCMP.Y, and DxCMP.K is obtained by compressing the CMYK band images of DOCUMENTx (x=1 to 5).C, DOCUMENTx.M, DOCUMENTx.Y, and DOCUMENTx.K.

Figure 6:
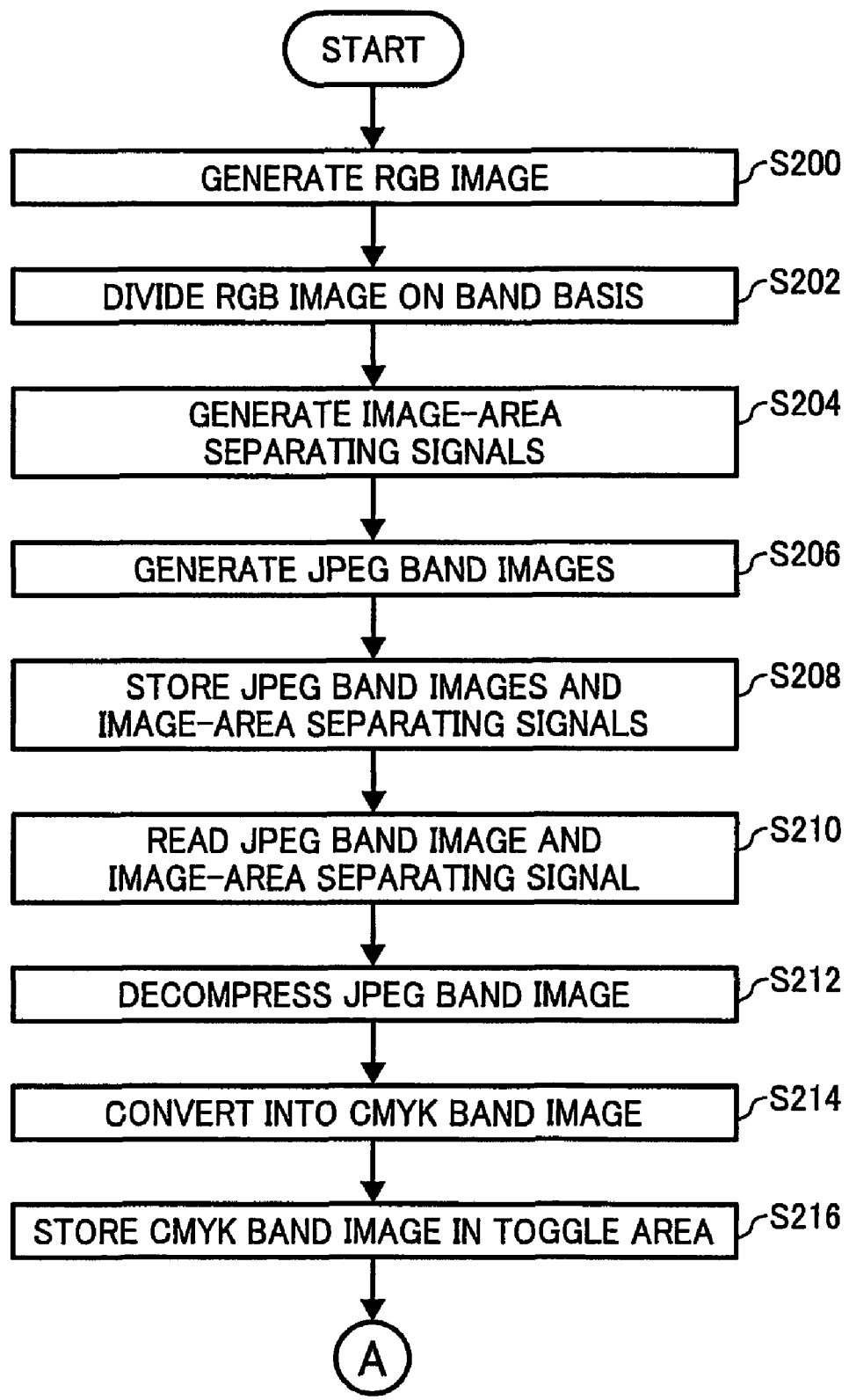
FIG. 6 is a flowchart of a process performed by the image forming apparatus shown in FIG. 4.
Figure 7:
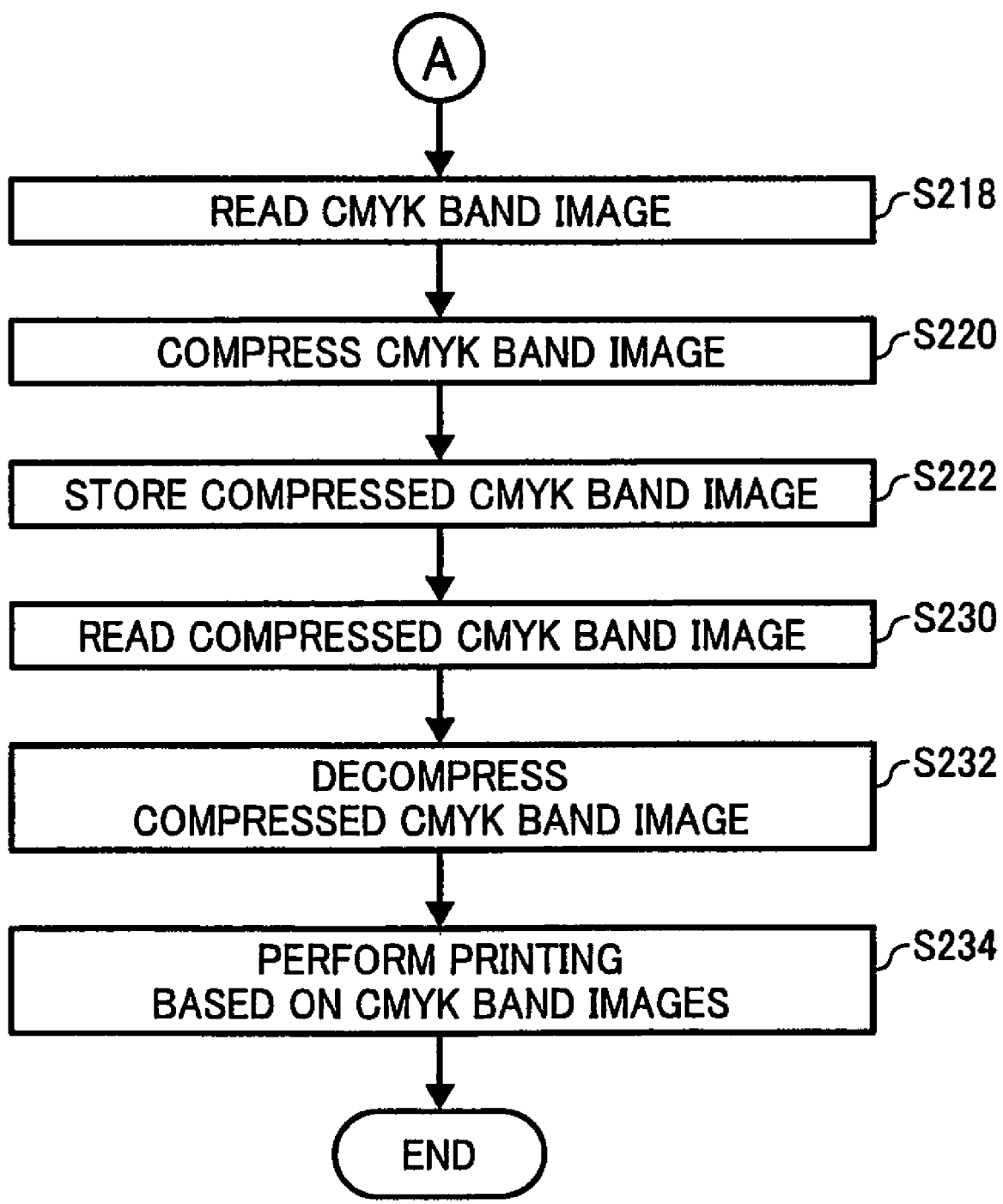
FIG. 7 is a flowchart of the process performed by the image forming apparatus shown in FIG. 4.

FIGS. 6 and 7 are flowcharts of a process performed by the image forming apparatus 2 according to the second embodiment. The scanner 201 reads an original document and generates an RGB image (step S200). The video signal processing ASIC 202 divides the RGB images on a band basis into RGB band images (step S202). Based on the RGB images, the video signal processing ASIC 202 generates image-area separating signals that correspond to the respective RGB band images (step S204).

Based on the RGB band images and the image-area separating signals, the RGB image processing ASIC 203 compresses the RGB band images into JPEG band images (step S206). Subsequently, the RGB image processing ASIC 203 stores the JPEG band images and the image-area separating signals in the JPEG area of the memory 205 (step S208). The RGB image processing ASIC 203 reads one of the JPEG band images stored in the JPEG region and an image-area separating signal that corresponds to the JPEG band image (step S210) and decompresses the JPEG band image into the RGB band image (step S212). The RGB image processing ASIC 203 performs a color conversion to convert the RGB band image into a CMYK band image (step S214). The RGB image processing ASIC 203 stores the CMYK band image into any one of the areas of TOGGLE1 and TOGGLE2 that is available (step S216).

In the image forming apparatus 2 according to the second embodiment, as described above, each process is performed on a band basis and the JPEG images and the image-area separating signals are stored in the memory 205 on a band basis.

As shown in FIG. 7, the CMYK image processing ASIC 206 reads the CMYK band image from one of the areas of TOGGLE1 and TOGGLE 2 in which the CMYK band image is stored (step S218). The CMYK image processing ASIC 206 compresses the CMYK band image into a compressed CMYK band image (step S220) and stores the compressed CMYK band image in the compressed CMYK area of the memory 205 (step S222). In this manner, by storing the compressed CMYK band image in the memory, it is possible to save the memory capacity.

The CMYK image processing ASIC 206 reads the compressed CMYK band image from the compressed CMYK area (step S230). Subsequently, the CMYK image processing ASIC 206 decompresses the compressed CMYK band image into the CMYK band image. After the CMYK band images corresponding to one page are obtained, the plotter 207 performs the printing process based on the CMYK band images (step S234). In this manner, the image forming apparatus 2 completes the process.

Figure 8:
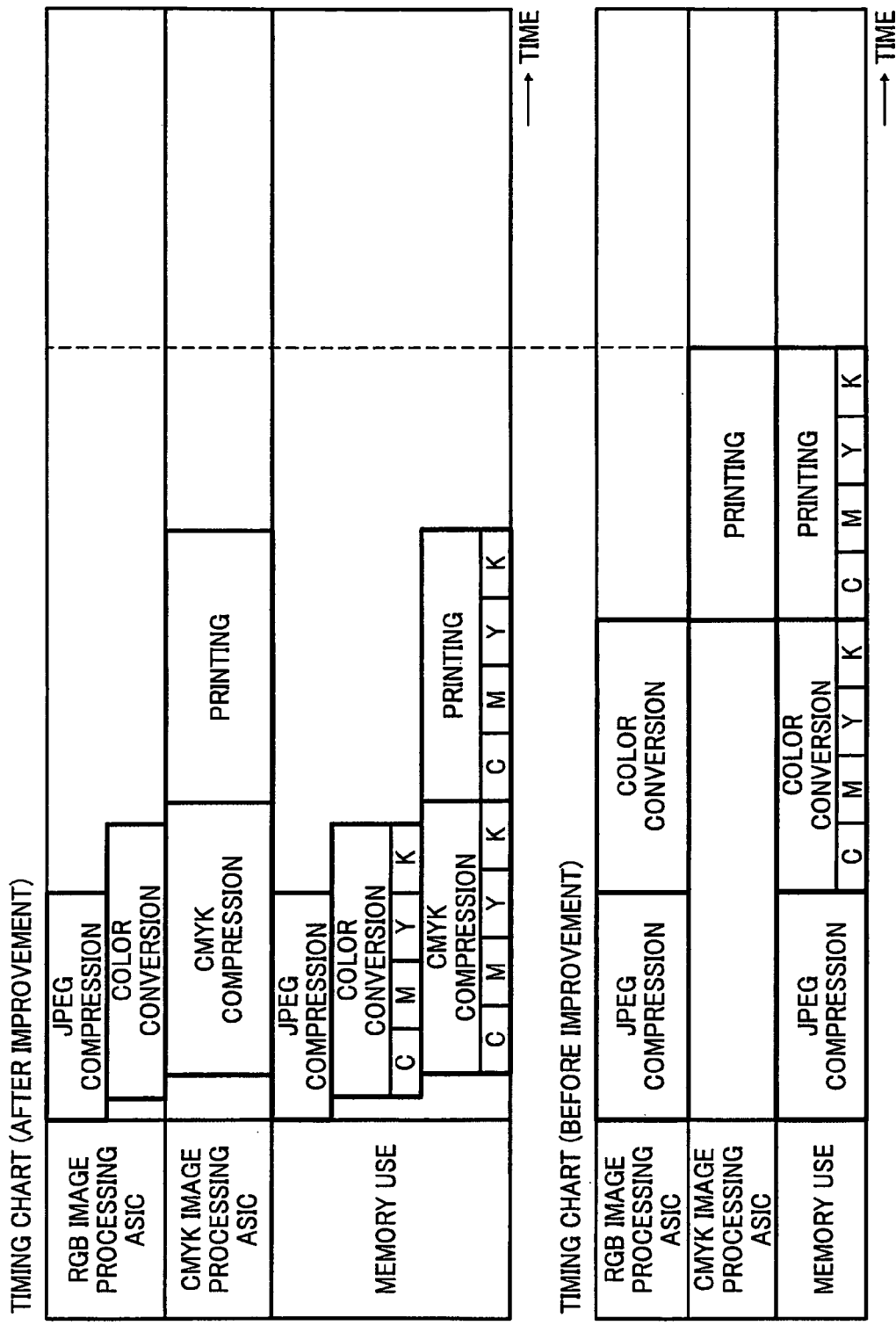
FIG. 8 is timing charts for explaining timing in the process performed by the image forming apparatus shown in FIG. 4.

FIG. 8 is timing charts for explaining timing in the process performed by the image forming apparatus 2. The upper timing chart represents the timing in the process performed by the image forming apparatus according to the second embodiment. The lower timing chart represents timing in a process performed as in the case of the process of the upper timing chart except that an RGB image is not divided into RGB band images.

As shown in the upper flowchart, a JPEG compression process on the RGB band images corresponding to one image, i.e., steps S200 to S208, is firstly performed in the image forming apparatus 2. The memory 5 (the JPEG area) is used for the Jpeg compression process until the Jpeg compression process is completed.

After one of the JPEG band images is stored in the memory 205, a color conversion process on the JPEG band image, i.e., steps S210 to S216, can be started. Therefore, the color conversion process is started in parallel with the Jpeg compression process.

As shown in FIG. 8, after the JPEG band image is stored in the memory 205, the memory 205 is used not only for the JPEG compression process but also for the color conversion process. Until the color conversion process on the JPEG band images corresponding to one page is completed, the memory 205 is used for the color conversion process. During the color conversion process, are used the JPEG area in which the JPEG band images are stored and the toggle area in which the CMYK band images obtained by performing the color conversion are stored.

After the CMYK band images corresponding to one band are stored in the toggle area, a CMYK compression process, i.e., steps S218 to S222, can be performed. After one of the CMYK band images is stored in the memory 205, the CMYK compression process is started in parallel with the JPEG compression process and the color conversion process.

As shown in FIG. 8, after the CMYK band image is stored in the memory 205, the memory 205 is used not only for the JPEG compression process and the color conversion process but also for the CMYK compression process. Until the CMYK compression process on the CMYK band images corresponding to one page is completed, the memory 205 is used for the CMYK compression process. During the CMYK compression process, the toggle area and the compressed CMYK area are used.

After the completion of the CMYK compression process on the CMYK band images corresponding to one page, the printing process for printing the CMYK band images, i.e., steps S230 to S234, can be performed. Therefore, the printing process is started after the CMYK compression process is completed. At the time when the printing process is started, all of the JPEG compression process, the color conversion process, and the CMYK compression process are already completed. During the printing process, only the compressed CMYK area is used in the memory 205.

As shown in the lower timing chart shown in FIG. 8, in the case where the process on an image of one page is performed without dividing the image on a band basis, the color conversion cannot be performed before a JPEG compression of one page is completed. Similarly, a printing process cannot be performed before the color conversion is completed. Therefore, although the CMYK compression process is not performed in this case, the process requires a time longer than that required for the process in which the image is divided on a band basis.

Because each process is performed on a band basis as described above in the image forming apparatus 2 according to the second embodiment, the JPEG compression process, the color conversion process, and the CMYK compression process can be performed in parallel. As a result, the process time and the time during which the memory is used can be reduced so that the processing efficiency increases. Moreover, by storing the compressed CMYK band images in the memory 25, it is possible to save the memory capacity.

Figure 9:
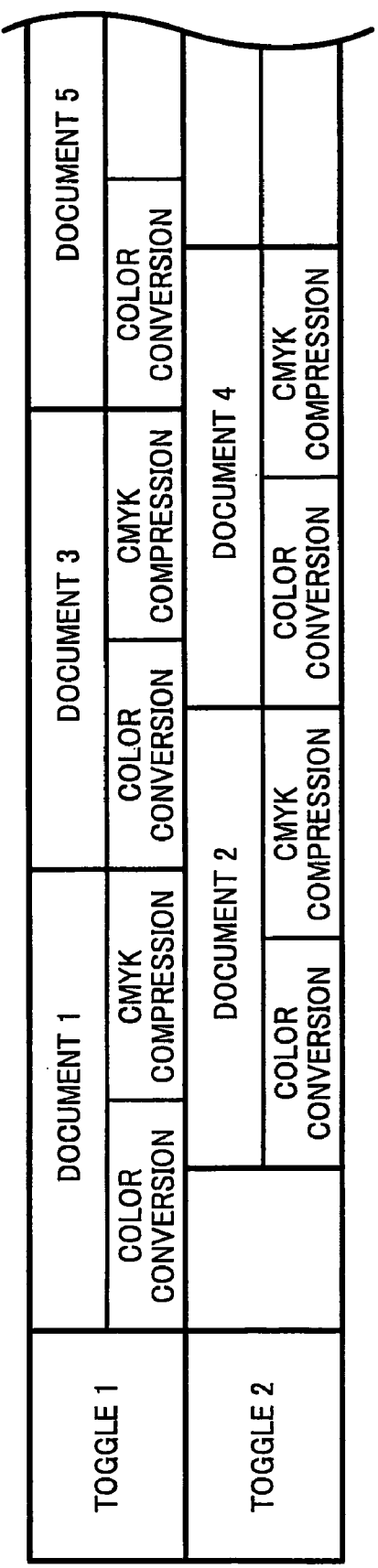
FIG. 9 is a schematic diagram for explaining a color conversion process and a CMYK compression process by use of toggle areas.

FIG. 9 is a schematic diagram for explaining the color conversion process and the CMYK compression process in both of which the toggle area is used. For example, as shown in FIG. 9, when the JPEG image of DOCUMENT1.JPG is stored in the memory 205, the RGB image processing ASIC 203 allocates the area of TOGGLE1 of the toggle area for a process of the JPEG image of DOCUMENT1.JPG. Specifically, a color conversion is performed on the JPEG image of DOCUMENT1.JPG to obtain the CMYK band image of DOCUMENT1.C, DOCUMENT1.M, DOCUMENT1.Y, and DOCUMENT1.K, and the CMYK band image of DOCUMENT1.C, DOCUMENT1.M, DOCUMENT1.Y, and DOCUMENT1.K is stored in the area of TOGGLE1. Subsequently, the RGB image processing ASIC 203 reads the CMYK band image from the area of TOGGLE1 and performs the compression process on the CMYK band image to obtain a compressed CMYK image.

In parallel with the above process, the RGB image processing ASIC 203 allocates the area of TOGGLE2 for a process on a JPEG image of DOCUMENT2.JPG stored in the memory 205 by the RGB image processing ASIC 203. In this case, the area of TOGGLE1 is already occupied with the JPEG image of DOCUMENT1.JPG. The RGB image processing ASIC 203 performs the color conversion and the compression process on the JPEG image of DOCUMENT2.JPG, using the toggle area of TOGGLE2. Because the toggle area is used in the above manner, the parallel processing can be performed as described above.

For example, approximately 256 MB is required to read an original document in a size of A3 as an image in an RGB color space at 500 dots per inch (dpi). To print the original document as an image in the CMYK color space at 600 dpi, memory capacity of approximately 133 MB is required. In other words, when a CMYK image is stored in a memory without compression, a memory capacity of 399 MB is required in total. On the other hand, by compressing the CMYK images and storing the CMYK images thus compressed in the memory as in the case of the second embodiment, the image can be copied with a memory capacity of only 364 MB. In other words, the cost of the image forming apparatus can be reduced.

The configuration and the functions of the image forming apparatus 2 according to the second embodiment except for those explained above are same as those of the image forming apparatus 1 according to the first embodiment.

As described above, according to an aspect of the present invention, because the memory of the image forming apparatus stores both of the first image represented in the first color space and the second image represented in the second color space, any of the first and the second images that corresponds to each of multiple functions can be used, i.e., both of the first and the second images can be used.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
    an image reading unit that reads an image as a first image represented in a first color space;
    a color converting unit that converts the first image into a second image represented in a second color space;
    a storing unit that stores therein the first image and the second image;
    a printing unit that prints the second image stored in the storing unit;
    a first compressing unit that compresses the first image into a first compressed image and stores the first compressed image in the storing unit;
    a first decompressing unit that reads the first compressed image from the storing unit and decompresses the first compressed image into the first image, wherein
        the color converting unit converts the first image obtained by the first decompressing unit into the second image without storing the first image in the storing unit, and
        the second image obtained by converting the first image is stored in the storing unit;
    a second compressing unit that reads the second image from the storing unit, compresses the second image into a second compressed image, and stores the second compressed image in the storing unit; and
    a second decompressing unit that reads the second compressed image from the storing unit and decompresses the second compressed image into the second image without storing the second compressed image in the storing unit, wherein
    the printing unit prints the second image obtained by the second decompressing unit.

2. The image forming apparatus according to claim 1, wherein, after the second image of a band is stored in the storing unit, the second compressing unit reads the second image from the storing unit, compresses the second image into the second compressed image, and stores the second compressed image in the storing unit.

3. The image forming apparatus according to claim 1, wherein, after the second compressing unit stores the second compressed image of a band in the storing unit, the second decompressing unit reads the second compressed image from the storing unit and decompresses the second compressed image into the second image.

4. The image forming apparatus according to claim 1, wherein
    the storing unit includes a first toggle area and a second toggle area each for storing the second image,
    the color converting unit stores the second image on a band basis in either one of the first toggle area and the second toggle area, and
    the second compressing unit reads the second image stored in either one of the first toggle area and the second toggle area and compresses the second image into the second compressed image.

5. The image forming apparatus according to claim 4, wherein each of the first toggle area and the second toggle area has a variable length.

6. The image forming apparatus according to claim 1, wherein the storing unit includes a compressed image area of a variable length for storing the second compressed image.

7. An image forming method comprising:
    first compressing a first image into a first compressed image;
    storing the first compressed image in a storing unit;
    first decompressing the first compressed image into the first image;
    converting the first image represented in a first color space read by an image reading unit into a second image represented in a second color space without storing the first image in the storing unit;
    reading the second image stored in the storing unit that stores therein the first image and the second image;
    second compressing the second image into a second compressed image;
    storing the second compressed image in the storing unit;
    second decompressing the second compressed image into the second image without storing the second compressed image in the storing unit: and printing the second image based on the second decompressing.

8. A non-transitory computer-readable medium configured to instruct a computer to:
  first compress a first image into a first compressed image;
  store the first compressed image in a storing unit:
  first decompress the first compressed image into the first image;
  convert the first image represented in a first color space read by an image reading unit into a second image represented in a second color space without storing the first image in the storing unit;
  read the second image stored in the storing unit that stores therein the first image and the second image;
  second compress the second image into a second compressed image;
  store the second compressed image in the storing unit;
  second decompress the second compressed image into the second image without storing the second compressed image in the storing unit: and
  print the second image based on the second decompress.

* * * * *